(12) United States Patent
Terao

(10) Patent No.: US 11,442,922 B2
(45) Date of Patent: Sep. 13, 2022

(54) DATA MANAGEMENT METHOD, DATA MANAGEMENT APPARATUS, AND NON-TRANSITORY COMPUTER READABLE MEDIUM

(71) Applicant: FUJIFILM Business Innovation Corp., Tokyo (JP)

(72) Inventor: Taro Terao, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 152 days.

(21) Appl. No.: 16/566,893

(22) Filed: Sep. 11, 2019

(65) Prior Publication Data

US 2020/0097457 A1 Mar. 26, 2020

(51) Int. Cl.
*G06F 21/00* (2013.01)
*G06F 16/23* (2019.01)
(Continued)

(52) U.S. Cl.
CPC ........ *G06F 16/2365* (2019.01); *H04L 9/3236* (2013.01); *H04L 9/50* (2022.05); *H04L 2209/56* (2013.01)

(58) Field of Classification Search
CPC ........ G06F 16/2365; G06F 8/71; G06F 21/64; H04L 9/3236; H04L 2209/38;
(Continued)

(56) References Cited

U.S. PATENT DOCUMENTS

2005/0114666 A1* 5/2005 Sudia ............... H04L 9/3247
713/175
2013/0067217 A1* 3/2013 Matzkel ............ H04L 63/083
713/155
(Continued)

FOREIGN PATENT DOCUMENTS

JP 2017-195627 10/2017

OTHER PUBLICATIONS

Alfred J. Menezes et al., "Handbook of applied cryptography," CRC press, Oct. 16, 1996, pp. 1-794.
(Continued)

*Primary Examiner* — Mahfuzur Rahman
(74) *Attorney, Agent, or Firm* — JCIPRNET

(57) ABSTRACT

A data management method includes: in a case where A denotes a set of symbols, A* denotes a set of all character strings composed of the symbols in A, L denotes a subset of A, and h(L) denotes a mapping performed on L with h that denotes a cryptographical hash function, regarding h: A*→A, multiple peers each hold an inverse mapping $h_L^{-1}$ of $h_L$: L→h(L) that denotes a partial mapping of h, and in a case where at least one original data item M and an encrypted data item C encrypted from the original data item M are present, the encrypted data item C being held in $h_L^{-1}$, and correspondence between the original data item M and the encrypted data item C is to be validated, calculating a hash value h(M); decrypting the encrypted data item C with a hash value k; and comparing a result of the decrypting with the original data item M.

9 Claims, 9 Drawing Sheets

(51) Int. Cl.
*H04L 9/32* (2006.01)
*H04L 9/00* (2022.01)

(58) Field of Classification Search
CPC . H04L 2209/56; H04L 9/3242; H04L 63/126; H04L 9/3239
See application file for complete search history.

(56) References Cited

U.S. PATENT DOCUMENTS

| | | | |
|---|---|---|---|
| 2017/0063530 A1* | 3/2017 | Fiske | H04L 9/0891 |
| 2019/0104121 A1* | 4/2019 | Khandani | H04L 9/0643 |
| 2020/0228315 A1* | 7/2020 | Fiske | H04L 9/0858 |

OTHER PUBLICATIONS

Office Action of Japan Counterpart Application, with English translation thereof, dated Jun. 28, 2022, pp. 1-5.

* cited by examiner

FIG. 8

| key | value |
|---|---|
| 39dd2bdd604cc5613f2f8102a84f051a | README |
| 9338444555ef099749997f99983ba0a9 | TREE OBJECT |
| da53d207fba1d9d2e6b39e77232b1c6d | COMMIT OBJECT |

FIG. 9

| p | k |
|---|---|
| 6fbd8a88a07cb5a632c8be3271889fae | 39dd2bdd604cc5613f2f8102a84f05 |
| 85c7c764a9a093f489c24c0dbc79aba8 | 9338444555ef099749997f99983ba0 |
| e5df2509c5b30b4c5785a0e85c2fba36 | da53d207fba1d9d2e6b39e77232b1c |

```
tree f0bf2d66672b706489d592fbea1f2d83
parent e5df2509c5b30b4c5785a0e85c2fba36
author Scott Chacon <schacon@gmaiX.com> 1521698626 -0700
committer Scott Chacon <schacon@gmaiX.com> 1521698626 -0700 update README and add index.js
```

FIG. 12

| key | value |
|---|---|
| 977a6f7659bc2453feed89e9648f4931 | ENCRYPTED README (UPDATED) |
| 846084d7781768b3804b93b042efe11e | ENCRYPTED index.js |
| f0bf2d66672b706489d592fbea1f2d83 | ENCRYPTED TREE OBJECT (UPDATED) |
| dac77c4e4fbe82a2f01a403b8602b75d | ENCRYPTED COMMIT OBJECT (UPDATED) |

FIG. 13

| key | value |
|---|---|
| 2bd5a72617eda69e41bf1f3112cba945 | README (UPDATED) |
| 63a9da12766808d7304af10ed6ba1dd0 | index.js |
| f71e6cd5e480570b28834f71b0766f90 | TREE OBJECT (UPDATED) |
| 95eee10c99c1afbf3dfe4272a6b67a62 | COMMIT OBJECT (UPDATED) |

| p | k |
|---|---|
| 977a6f7659bc2453feed89e9648f4931 | 2bd5a72617eda69e41bf1f3112cba9 |
| 846084d7781768b3804b93b042efe11e | 63a9da12766808d7304af10ed6ba1d |
| f0bf2d66672b706489d592fbea1f2d83 | f71e6cd5e480570b28834f71b0766f |
| dac77c4e4fbe82a2f01a403b8602b75d | 95eee10c99c1afbf3dfe4272a6b67a |

DATA MANAGEMENT METHOD, DATA MANAGEMENT APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-175986 filed Sep. 20, 2018.

BACKGROUND

(i) Technical Field

The present disclosure relates to a data management method, a data management apparatus, and a non-transitory computer readable medium.

(ii) Related Art

Japanese Unexamined Patent Application Publication No. 2017-195627 addresses providing an information processing apparatus, an information processing method, and a program that enable confidentiality of specific information to be secured. In the disclosure, the information processing apparatus encrypts generated data with a common key and stores the data in a block built in a network and linked by a blockchain. The information processing apparatus also acquires a second public key different from a first public key stored in advance from the block linked by the blockchain, encrypts the common key with the second public key, and stores the encrypted common key in a block linked by the blockchain.

Handbook of Applied Cryptography by Menezes, van Oorschot and Vanstone is also disclosed.

SUMMARY

Aspects of non-limiting embodiments of the present disclosure relate to a data management method, a data management apparatus, and a non-transitory computer readable medium.

Distributed electronic ledger technology called a blockchain is used in a distributed version management system such as Git for recording and tracing a modification history of a virtual currency, source code of a program, and the like. In the distributed electronic ledger technology, a key is decided regardless of the content of content. If the key is lost, it is not possible to validate that encrypted content corresponds to the original text yet to be encrypted.

It is an object of the present disclosure to provide a data management method, a data management apparatus, and a non-transitory computer readable medium that enable acquisition of identical encrypted texts from identical pieces of content.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a data management method including: in a case where A denotes a set of symbols, A* denotes a set of all character strings composed of the symbols in A, L denotes a subset of A, and h(L) denotes a mapping performed on L with h that denotes a cryptographical hash function, regarding h: A*→A, multiple peers each hold an inverse mapping $h_L^{-1}$ of $h_L$: L→h(L) that denotes a partial mapping of h, and in a case where at least one original data item M and an encrypted data item C encrypted from the original data item M are present, the encrypted data item C being held in $h_L^{-1}$, and correspondence between the original data item M and the encrypted data item C is to be validated, calculating a hash value h(M); decrypting the encrypted data item C with a hash value k; and comparing a result of the decrypting with the original data item M.

BRIEF DESCRIPTION OF THE DRAWINGS

An exemplary embodiment of the present disclosure will be described in detail based on the following figures, wherein:

FIG. 8 is an explanatory table illustrating an example data structure of a hidden key-value store;

FIG. 9 is an explanatory table illustrating an example data structure of paired public and privilege identifiers;

FIG. 12 is an explanatory table illustrating an example data structure of a shared key-value store;

FIG. 13 is an explanatory table illustrating an example data structure of a hidden key-value store;

DETAILED DESCRIPTION

Hereinafter, an example of an exemplary embodiment to implement the present disclosure will be described on the basis of the drawings.

Figure 1:
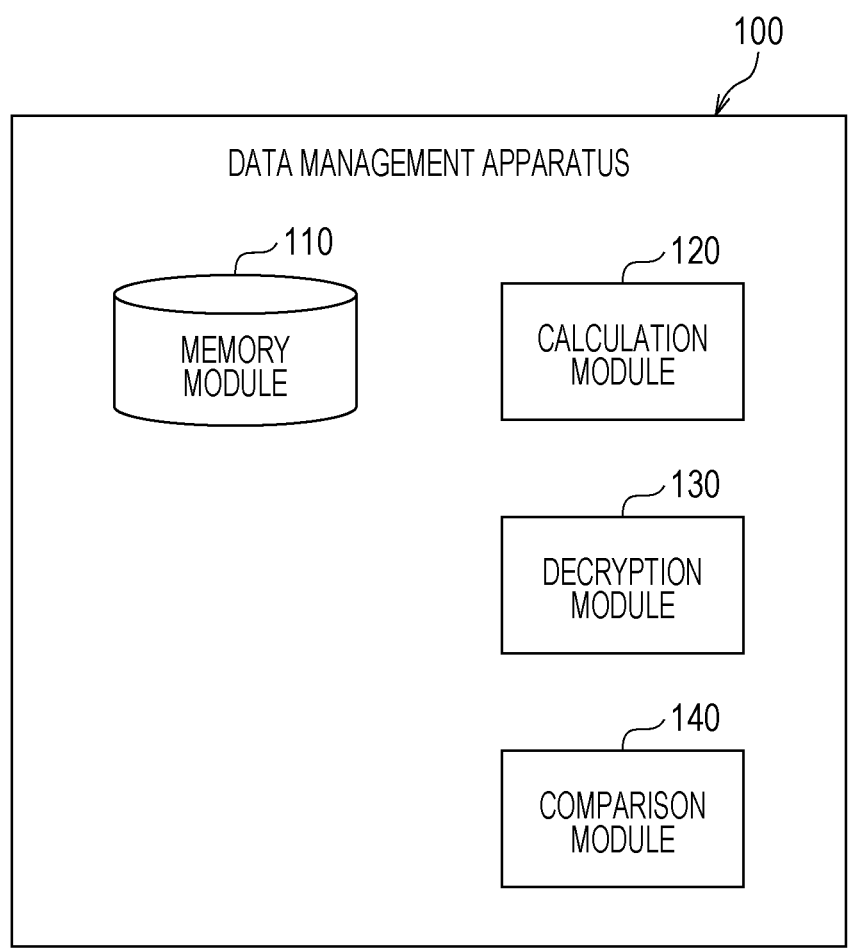
FIG. 1 is a conceptual module configuration diagram of an example configuration in this exemplary embodiment.

FIG. 1 is a conceptual module configuration diagram of an example configuration in this exemplary embodiment.

Note that the term "module" refers to generally logically separable components of software (computer programs) and hardware or the like. Modules in each exemplary embodiment thus refer to not only modules in a computer program but also modules in a hardware configuration. Accordingly, the description of the exemplary embodiment also serves as a description of a computer program for causing a computer to function as the modules (a program for causing a computer to execute steps, a program for causing a computer to function as components, and a program for causing a computer to implement functions) as well as a system and a method therefor. Meanwhile, the term "to store" and other terms equivalent to "to store" are used in descriptions. In a case where the exemplary embodiment describes a computer program, the term means storing something in a storage device or controlling something so as to store something in a storage device. The modules are provided for respective functions on a one-to-one basis. However, in implementing the functions, one program may constitute one module; one program may constitute multiple modules; and multiple programs may constitute one module. In addition, one computer may run multiple modules, and multiple computers may run one module in a distributed or parallel processing environment. Note that one module may include another module. Moreover, the term "connection" is used for not only a physical connection but also a logical connection (such as data exchange, instructions, a reference relationship among data items, or login). The term "predetermined" refers to having been determined before target processing. This term is used in such a manner as to include the meaning of being determined according to the situation at the determination time or to the situation thus far only before target processing, regardless of whether before or even after the start of processing in the exemplary embodiment. Meanwhile, in a case of multiple "predetermined values", the values may be different from one another, or two or more of the values may be the same (including all of the values). Moreover, an expression meaning "if A, then B" is used in such a manner as to mean that "it is determined whether A holds true, and if it is determined that A holds true, then B is performed". However, this excludes a case where the determination of whether A holds true is not needed. In addition, listing things such as "A, B, and C" is illustrative listing unless otherwise stated and includes selecting only one of the listed things (for example, only A).

A system, a device, or an apparatus includes not only a configuration in which multiple computers, hardware, apparatuses, and the like are connected to each other through a communication unit such as a network (including a communication connection on a one-to-one basis), but also a configuration in which a computer, hardware, an apparatus, or the like is implemented. The terms "device", "apparatus", and "system" are used as terms having the same meaning. It goes without saying that the "system" does not include a mere social "system" built in accordance with agreements worked out by humans.

In addition, to perform a processing operation or multiple processing operations in each module, the module reads target information from a storage device for each processing, performs the processing, and writes a processing result to the storage device. Accordingly, explanations of reading the content from the storage device before processing and writing the content to the storage device after the processing are omitted in some cases. Here, the storage device may include a hard disk drive, a random access memory (RAM), an external storage medium, a storage device connected through a communication network, a register in a central processing unit (CPU), and other devices.

A data management apparatus 100 that is the exemplary embodiment has a function related to a cipher system conforming to the distributed electronic ledger technology. As illustrated in the example in FIG. 1, the data management apparatus 100 includes a memory module 110, a calculation module 120, a decryption module 130, and a comparison module 140. For example, a blockchain and Git that is a version management apparatus use the distributed electronic ledger technology.

In the data management apparatus 100, A denotes a set of symbols, A* denotes a set of all character strings composed of the symbols in A, L denotes a subset of A, and h(L) denotes a mapping performed on L with h that denotes a cryptographical hash function.

The data management apparatus 100 is a data management apparatus in which regarding h: $A^* \to A$, multiple peers each hold an inverse mapping $h_L^{-1}$ of $h_L$: $L \to h(L)$ that denotes a partial mapping of h.

Original data M and encrypted data C encrypted from the original data M are present, and the encrypted data C is held in $h_L^{-1}$ (that is, $C \in L$).

The data management apparatus 100 validates correspondence between the original data M and the encrypted data C encrypted from the original data M. That is, the data management apparatus 100 identifies content by using the hash value of the content in the distributed electronic ledger technology.

The memory module 110 holds the encrypted data C.

In the data management apparatus 100, a hash value k=h(M) of the original data M may be set as a privilege identifier, a hash value p=h(C) of the encrypted data C corresponding to the original data M may be set as a public identifier, and a specific administrator peer may hide and hold original data items $M \in L_{secret}$.

The calculation module 120 calculates a hash value h(M).

The decryption module 130 performs decryption of the encrypted data C with k.

The comparison module 140 compares the original data M with the result of the decryption performed by the decryption module 130.

Figure 2:
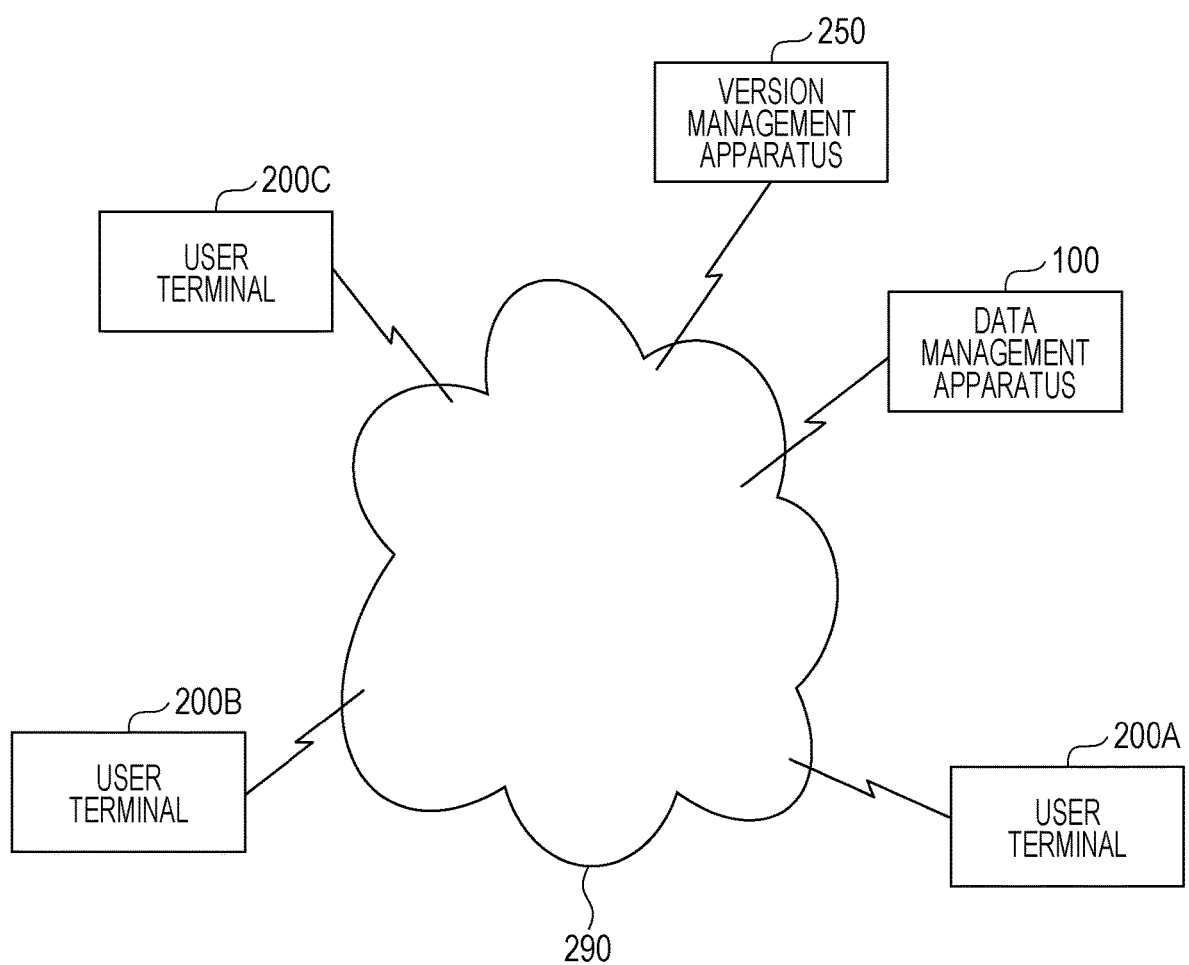
FIG. 2 is an explanatory diagram illustrating an example configuration of a system using this exemplary embodiment.

FIG. 2 is an explanatory diagram illustrating an example configuration of a system using this exemplary embodiment.

The data management apparatus 100, a user terminal 200A, a user terminal 200B, a user terminal 200C, and a version management apparatus 250 are connected to each other via a communication network 290. The communication network 290 may be a wireless network, a wired network, or combination of these, and may be, for example, the Internet serving as a communication infrastructure or an intranet. The function of the data management apparatus 100 may be implemented as a cloud service.

The data management apparatus 100 receives encrypted data and the original data (data yet to be encrypted) of the encrypted data from the user terminal 200 (each of the user terminals 200A to 200C is also referred to as the user terminal 200 if discrimination from each other is not needed) or the version management apparatus 250, determines whether the encrypted data corresponds to the original data, and transmits the result. The phrase "corresponds to" herein denotes that target encrypted data is encrypted from the original data.

The distributed electronic ledger technology enables implementation of an unmodifiable distributed ledger instead of a centralized entity and thus draws attention.

Bitcoin (registered trademark) is famous as an easy-to-understand practical example. Bitcoin implements an encrypted currency in such a manner that a history of money transfer (a transaction) from an entity to another entity is recorded as data in a ledger.

When the notion of a proof-of-work aspect of Bitcoin is abstracted, the non-modification of a blockchain is attributable to the following. When the value of the content of data is combined with a key indicating the data, optionality is eliminated, and thus the key is automatically decided from the value. The degree of freedom of combination of the key with the value is considered to be equivalent to room for modification.

Generalized formularization of the blockchain will be described.

In this exemplary embodiment, the blockchain is denoted by alphabetical letters including the cryptographical hash function h serving as a structure morphism, that is, is formularized as below.

$$h: A^* \to A$$

A character string (also called a word) using the alphabetical letters may be associated with a character (also called a symbol) representing a hash value. Since a character string may be simplified as a character at any time, for example, time series data called a chain may also be expressed.

Moreover, when a character is used for a key indicating a character string, the key is automatically (uniquely) decided from a character string serving as a value, and thus a so-called unmodifiable data structure may be implemented.

A public blockchain may be regarded as a partial mapping of h expressed as below.

$$h_L: L \to h(L) = A_L$$

In this case, L denotes a language for A, that is, a subset of A*, and h(L) denotes the mapping performed on L with h. In the formularization as described above, $h_L^{-1}$ for the distributed ledger may be regarded as a data management method and a protocol that are shared by the peers in the system.

Data (an object) in Git is not generally referred to in this formularization by using a word in the blockchain but may also be regarded as the blockchain.

For example, in the use case of Bitcoin, a transaction is based on data regarding money transfer between entities, and it is considered to be unclear that which existing person is equivalent to an entity. However, in some cases, hiding data itself recorded in the ledger is desired, for example, hiding a document such as a highly sensitive contract is desired.

At this time, if the data is encrypted with a randomly generated encryption key, key management becomes an issue.

For example, there is a case where the key is lost.

Assume a case where the original data M is safely stored in a private repository, encrypted data C is stored in a public blockchain, and the existence in terms of time (temporal existence) is secured by a timestamp.

If the randomly generated encryption key k is lost, it is difficult to reproduce the encryption key k from the original data M and the encrypted data C. Accordingly, it is not possible to validate the association between the original data and data in the blockchain and thus not possible to validate the non-modification and the temporal existence. In other words, in the related art, it is not possible to validate that the original data M corresponds to the encrypted data C.

Figure 3:
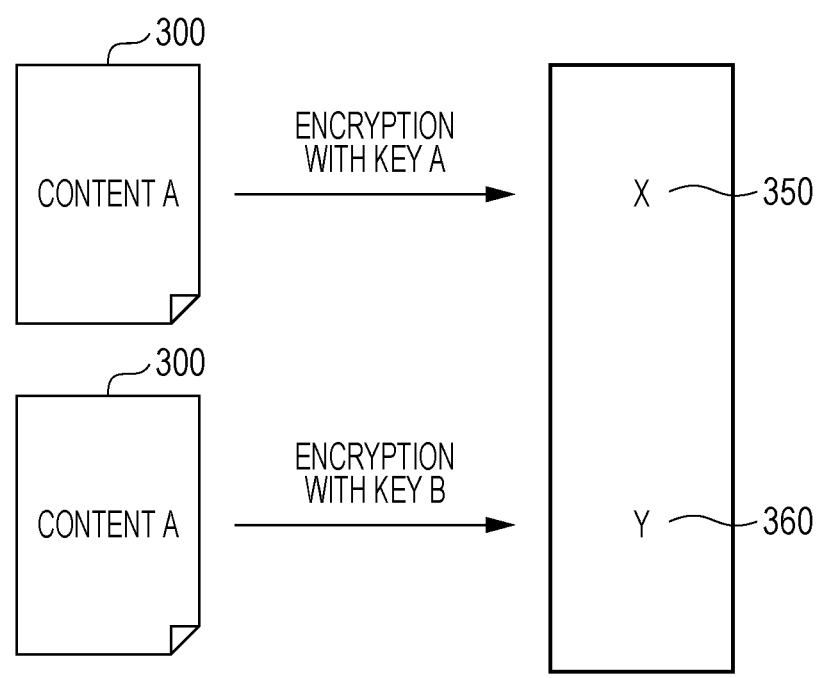
FIG. 3 is an explanatory diagram illustrating an example management method performed with distributed electronic ledger technology.

FIG. 3 is an explanatory diagram illustrating an example management method using general distributed electronic ledger technology. Specifically, FIG. 3 illustrates an example process executed without using the technology according to this exemplary embodiment (example process using the related art).

Content A 300 is encrypted with a key A, and thereby an encrypted text 350 is generated. The content A 300 is also encrypted with a key B, and an encrypted text 360 is generated. The encrypted text 350 and the encrypted text 360 are managed by the distributed electronic ledger technology.

If a key is lost, it is not possible to validate that the corresponding content (the encrypted text 350 or the encrypted text 360) is identified as the original text yet to be encrypted (the content A 300 in this example). Specifically, if the key A is lost, it is not possible to validate that text encrypted from the content A 300 is the encrypted text 350. This is because a key is decided regardless of the content of the content. In the description herein, the key A and the key B are different from each other, and thus encrypting the same content A 300 results in the encrypted text 350 and the encrypted text 360 that are different from each other.

In the data management apparatus 100 that is this exemplary embodiment, identical encrypted data items are acquired from identical data items (the content A 300 in the example in FIG. 3). Accordingly, it is possible to validate that encrypted content is identified as the original text yet to be encrypted.

Data confidentiality is desired in the distributed electronic ledger technology such as a public blockchain, and the desire may be satisfied by convergent encryption technology in which ciphertext (encrypted data) and an encryption key therefor are decided from cleartext (data to be encrypted).

The data management apparatus 100 that is this exemplary embodiment executes the following process.

With convergent encryption, the encryption key k=h(M) and the encrypted data $C=E_k(M)$ are decided from the original data M on the basis of the following.

$$M \mapsto (k, C)$$

A pair (p, k) (p herein denotes the hash value of the encrypted data C (p=h(C)) is safely stored.

In a case where the holder (validator) of the pair (p, k) is to validate the non-modification and the temporal existence, the holder (validator) presents k to a verifier, and thereby the verifier may determine that the following holds true.

$$M = D_k(C)$$

$$k = h(M)$$

Since the encryption key k may be reproduced from the original data M at any time, the identification of the encrypted data as the original data performed when the key is lost as described above is not prevented.

Figure 4:
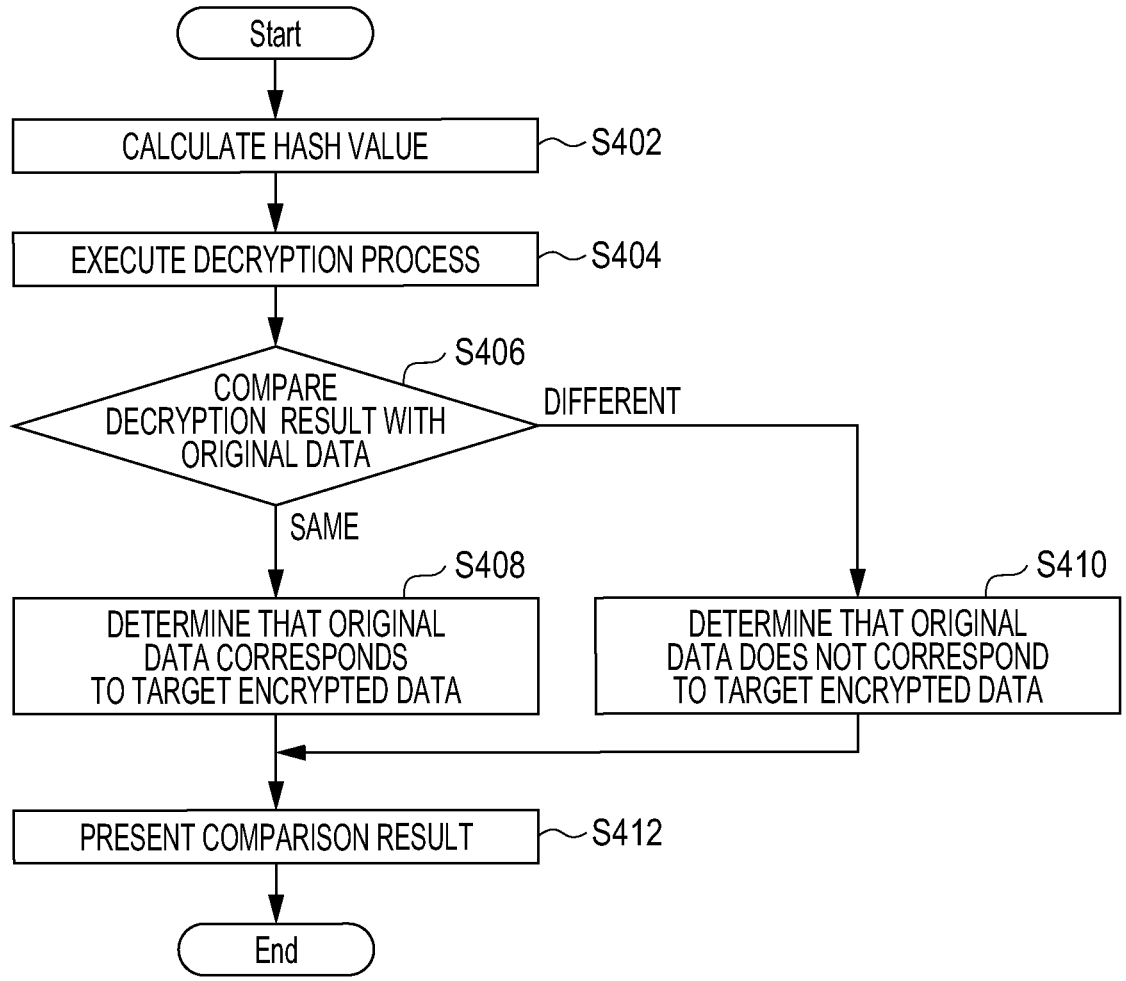
FIG. 4 is a flowchart illustrating an example process according to this exemplary embodiment.

FIG. 4 is a flowchart illustrating an example process according to this exemplary embodiment.

In step S402, the calculation module 120 calculates the hash value h(M).

In step S404, the decryption module 130 executes a decryption process on the encrypted data C with k.

In step S406, the comparison module 140 compares the decryption result in step S404 with the original data M. If the decryption result is the same as the original data M, the process proceeds to step S408. If the decryption result is different, the process proceeds to step S410.

In step S408, it is determined that the original data M corresponds to the target encrypted data C.

In step S410, it is determined that the original data M does not correspond to the target encrypted data C.

In step S412, the comparison result is presented to a user (or the requesting user terminal 200 or the like).

The description will be provided by using a specific data structure and the like.

The data structure basically conforms to the data structure of Git. However, assume a case where persistent data has been convergently encrypted. It goes without saying that a specific value seemed to be a hash value or an encryption key is provided as a value for only explanation (a so-called "fake").

An example where an encrypted object is stored in a directory git/objects in Git is used. The encryption process is started with a repository having one file, the file is updated, and then another file is added in the repository. The change in the encrypted distributed ledger $h_L^{-1}$ in this case will be described.

Figure 5:
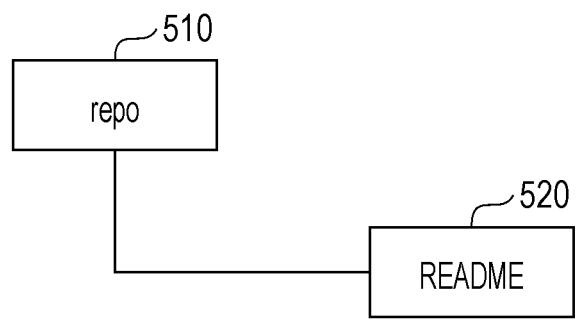
FIG. 5 is an explanatory diagram illustrating an example structure of a directory and a file that are a processing target.

The example in FIG. 5 is used as the first content. FIG. 5 is an explanatory diagram illustrating an example structure of a directory and a file that are a processing target.

There is a file (README) 520 in a layer lower than the layer of a directory (repo) 510.

The hash value of the file (README) 520 is 39dd2bdd604cc5613f2f8102a84f051a (a privilege identifier), and the hash value of the file (README) 520 encrypted with the hash value of the file (README) 520 is 6fbd8a88a07cb5a632c8be3271889fae (a public identifier).

In metadata (a tree object in Git) representing the directory (repo) 510, the hash value of 6fbd8a88a07cb5a632c8be3271889fae README 9338444555ef099749997f99983ba0a9 (a privilege identifier), and the hash value of the metadata encrypted with the hash value of the metadata representing the directory (repo) 510 is 85c7c764a9a093f489c24c0dbc79aba8 (a public identifier).

Figure 6:
FIG. 6 is an explanatory view illustrating example metadata.

Metadata 600 in FIG. 6 illustrates the metadata (a commit object in Git) representing the snapshot committing. Specifically, the metadata 600 is as follows.
tree 85c7c764a9a093f489c24c0dbc79aba8
author Scott Chacon <schacon@gmaiX.com> 1243040974-0700
committer Scott Chacon <schacon@gmaiX.com> 1243040974-0700
first commit
The hash value of the metadata 600 is da53d207fbald9d2e6b39e77232b1c6d (a privilege identifier), and the hash value of the metadata 600 encrypted with the hash value of the metadata 600 is e5df2509c5b30b4c5785a0e85c2fba36 (a public identifier).

Figure 7:
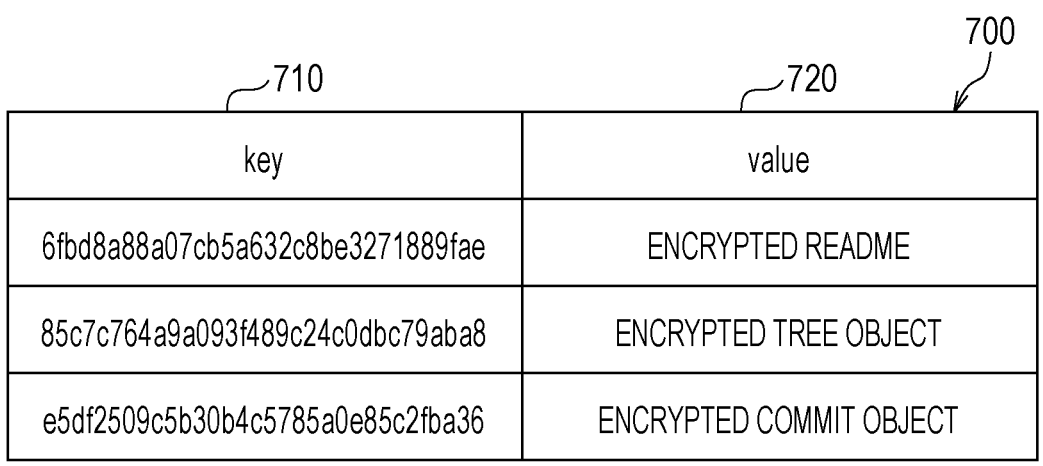
FIG. 7 is an explanatory table illustrating an example data structure of a shared key-value store.

At this time, a shared key-value store 700 illustrated in the example in FIG. 7 is recorded in a shared key-value store. FIG. 7 is an explanatory table illustrating an example data structure of the shared key-value store 700. The shared key-value store 700 has a key column 710 and a value column 720. The key column 710 stores keys, and the value column 720 stores values.

In contrast, a hidden key-value store 800 illustrated in the example in FIG. 8 is recorded in a hidden key-value store. FIG. 8 is an explanatory table illustrating an example data structure of the hidden key-value store 800. The hidden key-value store 800 has the same data structure as that of the shared key-value store 700. The hidden key-value store 800 has a key column 810 and a value column 820. The key column 810 stores keys, and the value column 820 stores values.

Paired public and privilege identifiers 900 illustrated in the example in FIG. 9 are recorded as pairs (p, k) of a public identifier and a privilege identifier. FIG. 9 is an explanatory table illustrating an example data structure of the paired public and privilege identifiers 900. The paired public and privilege identifiers 900 have a p column 910 and a k column 920. The p column 910 stores p (a public identifier), and the k column 920 stores k (a privilege identifier).

Since the pairs (paired public and privilege identifiers 900) may be reproduced from the "hidden key-value store" (hidden key-value store 800) at any time, only the "pairs of a public identifier and a privilege identifier" (paired public and privilege identifiers 900) may be provided without the "hidden key-value store" (hidden key-value store 800).

Figures 10, 11:
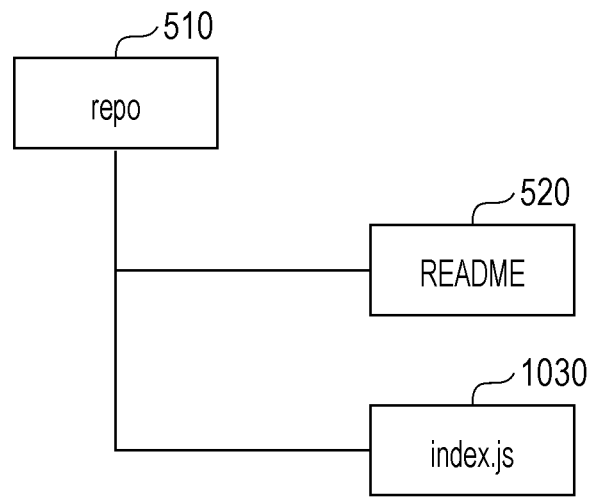
FIG. 10 is an explanatory diagram illustrating an example structure of a directory and files that are a processing target.
FIG. 11 is an explanatory view illustrating example metadata.

Subsequently, the file (README) 520 is modified, and a file (index.js) 1030 is added to the structure illustrated in the example in FIG. 5, as illustrated in the example in FIG. 10. FIG. 10 is an explanatory diagram illustrating an example structure of a directory and files that are a processing target. The file (index.js) 1030 is provided in addition to the file (README) 520 in the layer lower than that of the directory (repo) 510.

Updated metadata 1100 (a commit object) is illustrated in the example in FIG. 11. Specifically, the metadata 1100 is as follows.
tree f0bf2d66672b706489d592fbea1f2d83
parent e5df2509c5b30b4c5785a0e85c2fba36v
author Scott Chacon <schacon@gmaiX.com> 1521698626-0700
committer Scott Chacon <schacon@gmaiX.com> 1521698626-0700
update README and add index.js
The public identifier of the preceding commit object is included as parent and thus forms a chain.

A shared key-value store 1200 is added to the shared key-value store. FIG. 12 is an explanatory table illustrating an example data structure of the shared key-value store 1200. The shared key-value store 1200 has a key column 1210 and a value column 1220. The key column 1210 stores keys, and the value column 1220 stores values.

A hidden key-value store 1300 is added to the hidden key-value store. FIG. 13 is an explanatory table illustrating an example data structure of the hidden key-value store 1300. The hidden key-value store 1300 has a key column 1310 and a value column 1320. The key column 1310 stores keys, and the value column 1320 stores values.

Figures 14, 15:
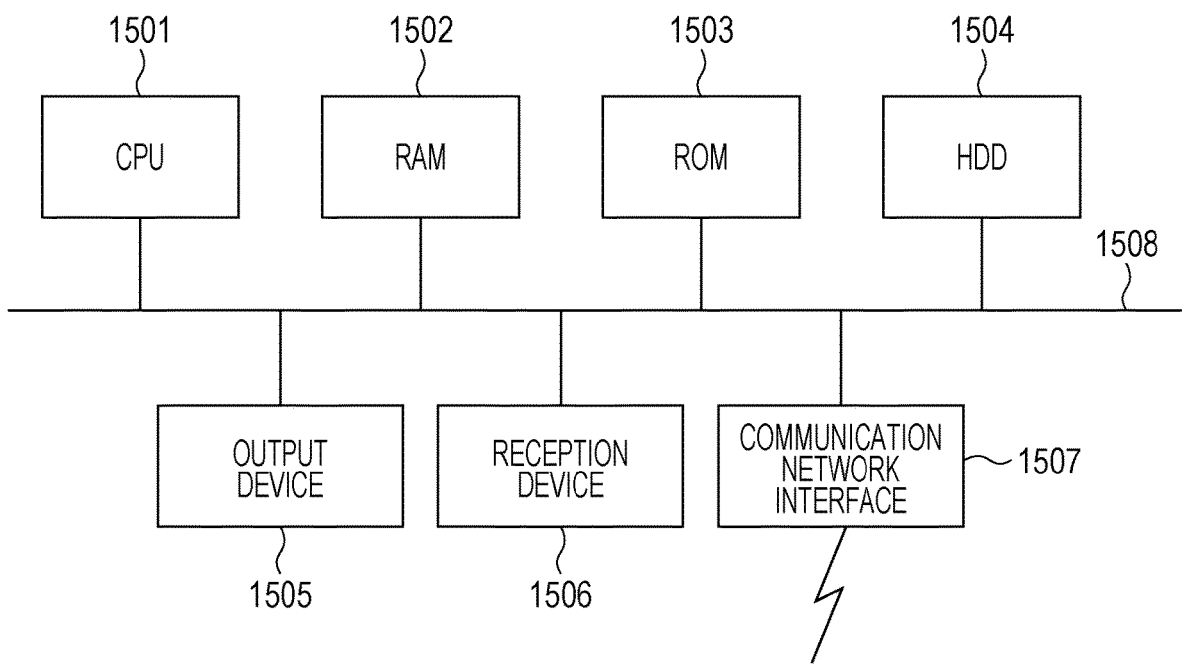
FIG. 14 is an explanatory table illustrating an example data structure of paired public and privilege identifiers.
FIG. 15 is a block diagram illustrating an example hardware configuration of a computer implementing this exemplary embodiment.

Paired public and privilege identifiers 1400 are added as pairs (p, k) of a public identifier and a privilege identifier. FIG. 14 is an explanatory table illustrating an example data structure of the paired public and privilege identifiers 1400. The paired public and privilege identifiers 1400 have a p column 1410 and a k column 1420. The p column 1410 stores p (a public identifier), and the k column 1420 stores k (a privilege identifier).

Even if a content encryption key is lost, the configuration of the blockchain as described above enables a public identifier and a privilege identifier to be reproduced from the original content and thus the correspondence between encrypted content and the original content to be validated.

Note that from the viewpoint of a hardware configuration, a computer that runs a program serving as this exemplary embodiment is a general computer as illustrated in FIG. 15, and specifically, is a personal computer, a computer capable of serving as a server, or another computer. In a specific example, a CPU 1501 is used as a processing unit (an arithmetic section), and a RAM 1502, a read only memory (ROM) 1503, and a hard disk drive (HDD) 1504 are used as memories. A HDD, a solid state drive (SSD) that is a flash memory, or the like may be used as the HDD 1504. The computer includes: the CPU 1501 that runs programs such as the calculation module 120, the decryption module 130, and the comparison module 140; the RAM 1502 that stores the programs and data; the ROM 1503 that stores a program for starting the computer and the like; the HDD 1504 that is an auxiliary memory having a function of the memory module 110 and the like; a reception device 1506 that receives data on the basis of a user operation (including operation, voice, a line of sight, and the like) performed on a keyboard, a mouse, a touch screen, a microphone, a camera (including a line-of-sight detection camera and the like), or another device; an output device 1505 such as a cathode ray tube (CRT) display, a liquid crystal display, a speaker, or another device; a communication network interface 1507 such as a network interface card for connection to a communication network; and a bus 1508 that connects these components for exchanging data. Multiple computers in this configuration may also be connected to each other via a network.

In the exemplary embodiment described above, an exemplary embodiment to be implemented by a computer program is implemented in the following manner. Specifically, a system in this hardware configuration reads a computer program that is software, and the software and the hardware resources cooperate with each other.

The hardware configuration in FIG. 15 illustrates an example configuration, and the configuration of the exemplary embodiment is not limited to the configuration illustrated in FIG. 15. Any configuration may be employed as long as the configuration enables the modules described with reference to the exemplary embodiment to be run. For example, at least one of the modules may be configured to run on dedicated hardware (such as an application specific integrated circuit (ASIC) or a reprogrammable integrated circuit (field-programmable gate array: FPGA)). At least one of the modules may be in an external system and be connected to the other modules via a communication network. Further, multiple systems each serving as the system illustrated in FIG. 15 may be mutually connected via a communication network to operate in cooperation with each other. In particular, the configuration may be incorporated in a mobile telecommunication device (including a mobile phone, a smartphone, a mobile device, a wearable computer, and other devices), a personal digital electronics, a robot, a copier, a fax machine, a scanner, a printer, a multifunction printer (an information processing apparatus having two or more functions of a scanner, a printer, a copier, a fax machine, and other devices), or the like, aside from a personal computer.

Note that the program described above may be provided by using a recording medium having the program recorded therein and may be provided by using a communication unit. In this case, for example, the program described above may be regarded as an exemplary embodiment of the disclosure of a "non-transitory computer readable medium having a program recorded therein".

The "non-transitory computer readable medium having a program recorded therein" refers to a computer readable recording medium having a program recorded therein that is used for installation, execution, distribution, and the like of a program.

Examples of the recording medium include: a digital versatile disk (DVD) supporting "DVD-R, DVD-RW, DVD-RAM, and the like" that are standards designated by the DVD Forum and "DVD+R, DVD+RW, and the like" that are standards designated in accordance with "DVD+RW; a compact disc (CD) such as a CD-ROM, a CD recordable (CD-R), or a CD rewritable (CD-RW); a Blu-ray (registered trademark) disc; a magneto-optical disk (MO); a flexible disk (FD); a magnetic tape; a hard disk; a ROM; an electrically erasable and programmable ROM (EEPROM (registered trademark)); a flash memory; a RAM; and a secure digital (SD) memory card.

Part or the entirety of the aforementioned program may also be saved on the recording medium to be stored or distributed. The program or part thereof may be transmitted through communication by using a transmission medium such as a wired network used for a local area network (LAN), a metropolitan area network (MAN), a wide area network (WAN), the Internet, an intranet, an extranet, or the like; a wireless communication network; or a combination of these. Alternatively, the program or part thereof may be transmitted by using carrier signals.

Further, the program may be part or the entirety of another program or may be saved on a recording medium together with a different program. The program may also be divided to be saved on multiple recording media. The program may be saved in any manner such as by being compressed or encrypted, as long as the program is restorable.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A data management apparatus comprising:
a memory;
a holding unit including a plurality of peers that hides and stores a plurality of original data items M;
a calculation unit;
a decryption unit; and
a comparison unit,
the calculation unit calculating a hash value k of the original data item M among the plurality of the original data item M hold by the holding unit by performing a mapping on the original data item M with a cryptographical hash function, that is, the hash value k is obtained from h(M),
the decryption unit performing decryption of the encrypted data C with the hash value k and obtaining a decrypted data item,
the comparison unit comparing the decrypted data item with the original data M, if the decrypted data item is the same as the original data item M, it is determined that the original data M corresponds to the encrypted data C, which means the encrypted data C is encrypted from the original data M,
if the decrypted data item is not the same as the original data item M, it is determined that the original data M does not correspond to the encrypted data C,
thereby the correspondence between the encrypted data C and the original data M is validated.

2. The data management apparatus according to claim 1, wherein the hash value k of the original data item M is set as a privilege identifier,
wherein a hash value p of the encrypted data item C corresponding to the original data item M is set as a public identifier, the hash value p is obtained by performing a mapping on the encrypted data item C with the cryptographical hash function, that is the hash value p is obtained from h(C), and wherein the holding unit hides and stores a plurality of the original data item M.

3. The data management method according to claim 2, further comprising recording a plurality of pairs (p, k), wherein the hash value p is the privilege identifier and the hash value p is the privilege identifier, and in a case that a content encryption key is lost, the privilege identifier and the privilege identifier is reproduced, and the correspondence between the encrypted data C and the original data M is validated.

4. A non-transitory computer readable medium storing a program causing a computer to execute a process, the process comprising:

calculating a hash value k of an original data item M by performing a mapping on the original data item M with a cryptographical hash function, that is, the hash value k is obtained from h(M);

decrypting an encrypted data item C with the hash value k and obtain a decrypted data item; and comparing the decrypted data item with the original data item M, if the decrypted data item is the same as the original data item M, it is determined that the original data M corresponds to the encrypted data C, which means the encrypted data C is encrypted from the original data M, if the decrypted data item is not the same as the original data item M, it is determined that the original data M does not correspond to the encrypted data C, thereby the correspondence between the encrypted data C and the original data M is validated.

5. The non-transitory computer readable medium storing the program causing the computer to execute the process according to claim 4, in the process, wherein the hash value k of the original data item M is set as a privilege identifier, wherein a hash value p of the encrypted data item C corresponding to the original data item M is set as a public identifier, the hash value p is obtained by performing a mapping on the encrypted data item C with the cryptographical hash function, that is the hash value p is obtained from h(C), and wherein the holding unit hides and stores a plurality of the original data item M.

6. The non-transitory computer readable medium storing the program causing the computer to execute the process according to claim 5, the process further comprising recording a plurality of pairs (p, k), wherein the hash value p is the privilege identifier and the hash value p is the privilege identifier, and in a case that a content encryption key is lost, the privilege identifier and the privilege identifier is reproduced, and the correspondence between the encrypted data C and the original data M is validated.

7. A data management method, adaptive for a cipher system conforming to a distributed electronic ledger technology, wherein the method comprising:

calculating a hash value k of an original data item M by performing a mapping on the original data item M with a cryptographical hash function, that is, the hash value k is obtained from h(M);

decrypting an encrypted data item C with the hash value k and obtain a decrypted data item; and comparing the decrypted data item with the original data item M, if the decrypted data item is the same as the original data item M, it is determined that the original data M corresponds to the encrypted data C, which means the encrypted data C is encrypted from the original data M, if the decrypted data item is not the same as the original data item M, it is determined that the original data M does not correspond to the encrypted data C, thereby the correspondence between the encrypted data C and the original data M is validated.

8. The data management method according to claim 7, wherein the hash value k of the original data item M is set as a privilege identifier, wherein a hash value p of the encrypted data item C corresponding to the original data item M is set as a public identifier, the hash value p is obtained by performing a mapping on the encrypted data item C with the cryptographical hash function, that is the hash value p is obtained from h(C), and wherein a specific administrator peer hides and stores a plurality of the original data item M.

9. The data management method according to claim 8, further comprising recording a plurality of pairs (p, k), wherein the hash value p is the privilege identifier and the hash value p is the privilege identifier, and in a case that a content encryption key is lost, the privilege identifier and the privilege identifier is reproduced, and the correspondence between the encrypted data C and the original data M is validated.

* * * * *